March 7, 1939.   H. J. JEZEK ET AL   2,149,775
BRAKE OPERATOR FOR TRAILERS
Filed Feb. 5, 1938   2 Sheets-Sheet 1
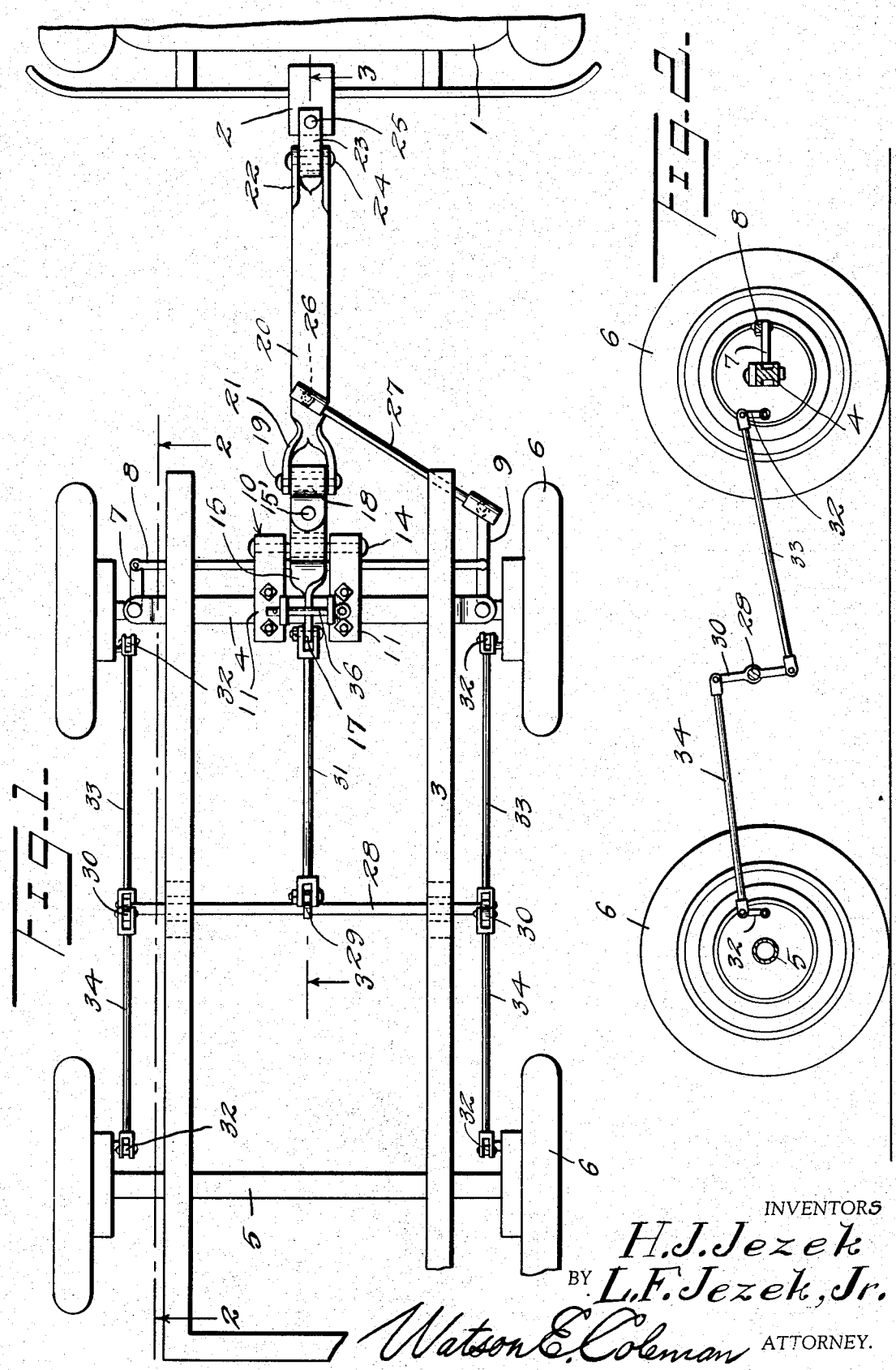
INVENTORS
*H.J.Jezek*
BY *L.F.Jezek, Jr.*
*Watson E. Coleman* ATTORNEY.

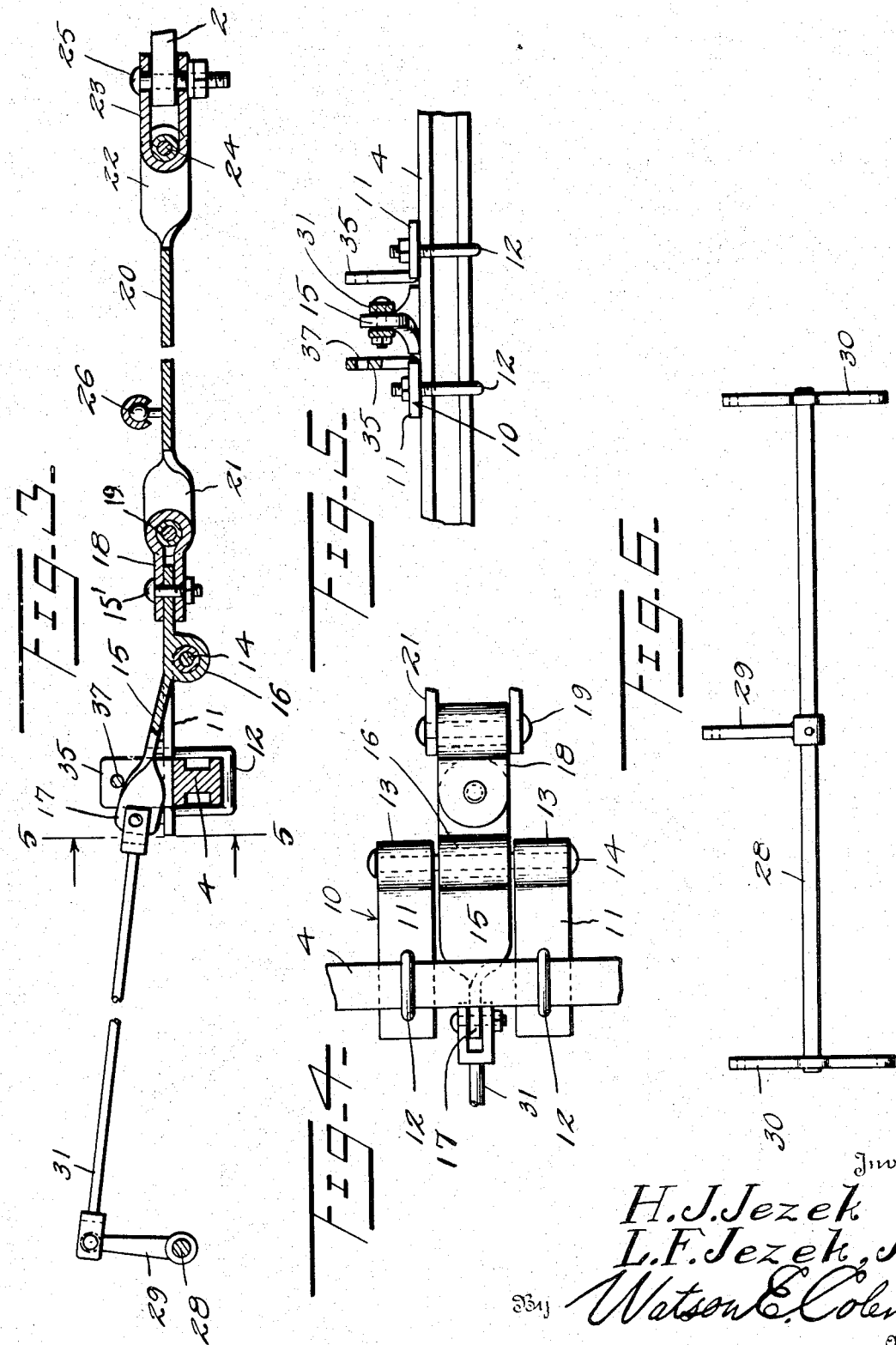

Patented Mar. 7, 1939

2,149,775

UNITED STATES PATENT OFFICE 2,149,775

BRAKE OPERATOR FOR TRAILERS

Henry J. Jezek and Louis F. Jezek, Jr., Temple, Tex.

Application February 5, 1938, Serial No. 188,983

4 Claims. (Cl. 188—142)

This invention relates to vehicle brake actuating mechanism and pertains particularly to a novel type of such mechanism for use upon trailers.

The present invention has for its primary object to provide a novel and improved brake actuating mechanism for motor vehicle trailers which is inertia operated in that tendency of the trailer structure to continue moving forwardly when the leading or draft vehicle is slowed up effects the actuation of certain mechanism to apply the brakes to the wheels of the trailer.

Another object of the invention is to provide an improved brake actuating mechanism for trailers which is of relatively simple design, easily and quickly applied to the chassis of the trailer and adapted to have a portion thereof connected with the steering mechanism of the trailer, whereby turning movements of the lead vehicle will be imparted to the trailer and the mechanism for actuating the trailer brakes may, at the same time, be operated.

A still further object of the invention is to provide a brake actuating mechanism for trailers which may be easily and quickly locked, if desired, so as to operate the trailer without the brake operating mechanism working when the trailer is stopped.

A further object of the invention is to provide a novel form of coupling device forming a part of the brake actuating mechanism, whereby a hitch bar may be coupled with the trailer in a manner to permit substantially universal movement between it and the trailer axle and whereby, by the action of a rearward thrust being imparted to the trailer hitch bar, the necessary movement may be imparted to brake rods to effect the actuation of the brakes.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of a trailer chassis equipped with the brake operating mechanism embodying the present invention and shown applied to a draft vehicle.

Figure 2 is a section taken on the line 2—2 of Figure 1.

Figure 3 is a section taken on the line 3—3 of Figure 1.

Figure 4 is a view in bottom plan of the front axle carried unit.

Figure 5 is a section taken on the line 5—5 of Figure 3.

Figure 6 is a view in elevation of the counter shaft.

Referring now more particularly to the drawings, the numeral 1 generally designates the rear end portion of a motor vehicle from which is extended the coupling head 2 of any suitable type for the attachment to the vehicle of the draft or hitch bar of a trailer, while the numeral 3 generally designates the chassis frame of a trailer, the front and rear axles of the same being indicated by the numerals 4 and 5 and the supporting wheels by the numeral 6.

The steering mechanism for the trailer illustrated comprises the forwardly extending spindle arms 7 which are connected in the usual well known manner to the steering spindles of the front wheels, the arms being coupled together by the usual transversely extending connecting rod 8. Upon one of the front wheel spindles is the usual forwardly extending steering arm 9, with which an element of the trailer hitch and brake actuating mechanism embodying the present invention is adapted to be connected.

The mechanism embodying the present invention comprises a front axle supported unit, which is generally designated by the numeral 10, and which comprises the pair of arm plates 11 arranged in spaced side by side relation and disposed at their rear ends across the top of the front axle 4 and secured thereto by the U-bolts 12, which have the free ends of the shanks thereof extended through the plates and the yokes of the bolts passing beneath the axle. The forward end of each plate carries or is formed to provide a bearing sleeve 13 and these sleeves are in axial alinement transversely of the trailer structure and forwardly of the front axle and support the ends of the supplemental axle 14 which parallels the vehicle front axle.

Extending across the supplemental axle 14 and supported thereon in the area between the plates 11, is an oscillatable link 15, the underside of which carries the bearing sleeve 16 through which the axle 14 passes. This link extends rearwardly and slightly upwardly, as shown, over the top of the axle 4 on which it is adapted to rest and it is turned at its rear end to form the apertured ear 17.

The forward end of the link 15 has a vertical bolt or pivot pin 15' extended therethrough and this pin has pivotally attached thereto the horizontally oscillatable hinge element 18 through the forward part of which a pivot pin 19 passes to provide a horizontal pivot or axis for the rear of the draft beam 20. This rear end of the draft beam, while it may be formed in any suitable manner for connection with the pivot pin 19 so that it may oscillate in a vertical plane as contrary to the horizontal plane of oscillation of the element 18, is preferably divided to form the spaced ears 21 between which the element 18 positions and through which the ends of the pivot pin 19 pass. The forward end of the draft beam 20 may be similarly formed to provide the ears 22 between which the rear portion of a hinge element 23 positions to be pivotally secured by the transverse pivot pin 24 by which the hinge element 23 is given vertical oscillatory motion. This hinge element 23 is preferably in the form of a U-shaped yoke and is adapted to have its forwardly extending free end portions arranged to receive the head of the draft hitch 2, which is carried by the draft vehicle 1, the connection between the head and the element 23 being by means of a pivot pin 25 or in any other suitable manner which will provide a pivotal connection so that the necessary lateral oscillation of the head 2 may take place when the lead vehicle turns.

Adjacent the rear end of the draft bar 20, a ball headed post 26 is mounted which forms one element of a ball and socket coupling between an end of a steering link 27 and the draft bar 20. The other end of this steering link is connected by the usual ball and socket coupling with the forward end of the steering arm 9. With this arrangement, it will be readily apparent that lateral swinging movement of the draft bar 20 caused by the turning of the lead vehicle 1, will effect the transmission of the proper thrust movement to the arm 9, which will be transmitted to the spindles of the front wheels of the trailer so as to cause the wheels to turn in the proper manner to make the trailer properly follow the draft vehicle.

Disposed transversely of the trailer chassis 3 between the front and rear wheels, is a counter shaft 28 which is mounted in any suitable manner, so that it may be oscillated. This shaft 28 has intermediate its ends the crank arm 29 secured thereto and at each of its ends are the double crank arms 30, one end of each of which extends downwardly, while the other end is directed upwardly.

The central crank arm 29 carried by the shaft 28 is connected by the pull rod 31 with the terminal ear 17 at the rear end of the oscillatable link 15.

The numeral 32 designates the short crank arms which are associated with the wheel brakes. The arms 32 associated with the front brakes are connected by pull rods 33 with the lower ends of the double cranks 30, while the arms 32 which are associated with the rear brakes are connected by the pull rods 34 with the upper ends of the double crank arms.

From the foregoing it will be readily apparent that when the draft bar 20 is coupled with the rear end of the vehicle 1 and the latter vehicle is moving forwardly, the trailer will be pulled by the strain imparted through the draft beam 20 to the axle 4 through the medium of the interposed oscillatably mounted link 15. When the vehicle 1 is slowed up as by the application of its brakes, it will be apparent that the momentum of the trailer will tend to move it forwardly toward the draft vehicle and when this occurs a rearward thrust will be imparted by the draft bar 20 against the oscillatable link 15, which will result in it being oscillated on the auxiliary axle 14, so as to swing the apertured rear end 17 upwardly. This will transmit a forward pull to the rod 31, oscillating the shaft 28 and turning the double cranks 30 so as to pull rearwardly on the forwardly extending rods 33 and pull forwardly upon the rearwardly extending rods 34 to actuate the brake setting levers 32.

By the provision of the spaced upstanding ears 35 upon either side of the end of the link 15 rearwardly of the pivotal line thereof, provision is made for locking the trailer brake actuating mechanism as a pin member 36 may be extended through the apertures 37 of the ears 35 so as to overlie the rear end of the link 15 and prevent it from rising when a rearward thrust is applied to its forward end in the manner stated.

From the foregoing, it will be readily apparent that there has been herein described a brake actuating mechanism which, while comparatively simple in construction, will function efficiently and it will be readily apparent that the functioning efficiency of the device increases automatically with the weight of the trailer and with the speed at which the draft vehicle in front of the trailer is slowed up, because of the fact that it operates by inertia, due to the tendency of the trailer to continue to move forwardly when the draft vehicles forward movement is checked.

We claim:

1. A brake actuating mechanism for a trailer having a chassis and a pair of supporting wheels each provided with a brake and actuating mechanism therefor, comprising a unit adapted to be mounted at the forward end of the chassis and including an axle extending transversely of the chassis, an elongated link member disposed across said unit axle and adapted to oscillate thereon in a vertical plane, a draft bar, pivotal means coupling one end of the draft bar with the forward end of said oscillatably mounted link by which lateral and vertical swinging of the draft bar is permitted, said link at its rear end having an ear, means preventing the downward swinging movement of the rear end of said link but permitting the said link forward end to swing downwardly whereby the rear end will swing upwardly when a rearward thrust is imparted to the link by the draft bar, and pull means coupling said link ear with said brake actuating means whereby the upward swinging of the rear end of the said link will effect the application of the trailer brakes.

2. A brake actuating mechanism for a trailer having front and rear pairs of supporting wheels for a chassis and a brake associated with each rear wheel with mechanism for actuating the same, comprising a pair of plate members adapted to be secured to the forward part of the trailer to project forwardly of the front axle of the latter, each of said plates terminating at its forward end in a bearing, a supplemental axle supported by said bearings, an oscillatable link extending across said supplemental axle and having pivotal connection therewith to oscillate vertically, said link at its rear end extending across and being adapted to rest upon said front axle, the forward end of the link having a horizontally swingable hinge element coupled therewith, a draft bar pivotally attached at one end to said hinge element to oscillate on a horizontal axis, the other end of the draft bar being adapted for attachment to a draft vehicle, and a pull rod connecting the rear end of said vertically oscillatable link with the said wheel brake actuating mechanism.

3. A brake actuating mechanism for a trailer having front and rear pairs of supporting wheels and a brake associated with each rear wheel with mechanism for actuating the same, comprising a short supplemental axle disposed forwardly of and parallel with the front axle connecting said front supporting wheels, an elongated oscillatable link disposed across and upon said supplemental axle and having pivotal attachment thereto for vertical oscillation, said link extending at its rear end across the said front axle and adapted to rest thereon, a vertical pivot pin extending through said link forwardly of the supplemental axle, a draft bar, an intermediate link connecting one end of said draft bar with the said vertical pivot of the oscillatable link, horizontal pivotal connecting means between the intermediate link and said end of the draft bar, means for coupling the other end of the draft bar to a draft vehicle, a steering arm connected at one end with the draft bar forwardly of said intermediate link and extending toward the side of the trailer for attachment at its other end with a steering arm adjacent a front wheel of the trailer, and coupling means between the said rear end of the vertically oscillatable link and said brake actuating mechanism whereby vertical oscillation of the rear end of the first-mentioned link will effect the setting of said brakes.

4. A brake actuating mechanism for a trailer having front and rear pairs of supporting wheels and a brake associated with each rear wheel with mechanism for actuating the same, comprising a short supplemental axle disposed forwardly of and parallel with the front axle connecting said front supporting wheels, an elongated oscillatable link disposed across and upon said supplemental axle and having pivotal attachment thereto for vertical oscillation, said link extending at its rear end across the said front axle and adapted to rest thereon, a vertical pivot pin extending through said link forwardly of the supplemental axle, a draft bar, an intermediate link connecting one end of said draft bar with the said vertical pivot of the oscillatable link, horizontal pivotal connecting means between the intermediate link and said end of the draft bar, means for coupling the other end of the draft bar to a draft vehicle, a steering arm connected at one end with the draft bar forwardly of said intermediate link and extending toward the side of the trailer for attachment at its other end with a steering arm adjacent a front wheel of the trailer, coupling means between the said rear end of the vertically oscillatable link and said brake actuating mechanism whereby vertical oscillation of the rear end of the first-mentioned link will effect the setting of said brakes, means forming a pair of vertical ears disposed over said front axle with the rear end of the first link disposed therebetween, and a lock pin insertible through apertures in said ears to lie across the rear end of said first link to prevent its vertical movement.

HENRY J. JEZEK.
LOUIS F. JEZEK, JR.